(12) United States Patent
Etchebehere Juan et al.

(10) Patent No.: US 11,665,304 B1
(45) Date of Patent: May 30, 2023

(54) ENCODING PLURAL COLORANT VECTORS IN A NEUGEBAUER PRIMARY AREA COVERAGE VECTOR

(71) Applicant: HEWLETT-PACKARD DEVELOPMENT COMPANY, L.P., Spring, TX (US)

(72) Inventors: Sergio Etchebehere Juan, Sant Cugat del Valles (ES); Peter Morovic, Sant Cugat del Valles (ES); Javier Maestro Garcia, Sant Cugat del Valles (ES); Pere Gasparin Talarn, Sant Cugat del Valles (ES); Jan Morovic, London (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/806,101

(22) Filed: Jun. 9, 2022

(51) Int. Cl.
*H04N 1/60* (2006.01)
*H04N 1/52* (2006.01)

(52) U.S. Cl.
CPC ............. *H04N 1/6019* (2013.01); *H04N 1/52* (2013.01)

(58) Field of Classification Search
CPC .......... H04N 1/50–6097; H04N 1/405; G06K 15/1878–1881
See application file for complete search history.

(56) References Cited

U.S. PATENT DOCUMENTS

| | | | |
|---|---|---|---|
| 10,623,606 B2 * | 4/2020 | Morovic | H04N 1/6027 |
| 10,868,943 B2 * | 12/2020 | Morovic | G01J 3/46 |
| 10,897,556 B2 * | 1/2021 | Morovic | H04N 1/60 |
| 11,418,682 B2 * | 8/2022 | Morovic | H04N 1/60 |

FOREIGN PATENT DOCUMENTS

| | | | | |
|---|---|---|---|---|
| WO | WO-2020145976 A1 * | 7/2020 | | G06K 15/1878 |
| WO | WO-2022086550 | 4/2022 | | |

* cited by examiner

*Primary Examiner* — Scott A Rogers

(57) ABSTRACT

A system encodes a plurality of colorant vectors of a printer in a Neugebauer Primary area coverage (NPac) vector for use in selecting colorants to output an image by the printer. The encoding includes using a function that relates the plurality of colorant vectors to an NP matrix including a plurality of sets of NPs that correspond to different colorant vectors of the plurality of colorant vectors, and determining the NPac vector based on achieving an objective for the function.

15 Claims, 4 Drawing Sheets

FIG. 2

| | Blank | M | MM | C | CM | CMM | CC | CCM | CCMM | Y | YY | CY | CYY | CCY | CCYY |
|---|---|---|---|---|---|---|---|---|---|---|---|---|---|---|---|
| C | 0 | 0 | 0 | 1 | 1 | 1 | 2 | 2 | 2 | 0 | 0 | 0 | 0 | 0 | 0 |
| M | 0 | 1 | 2 | 0 | 1 | 2 | 0 | 1 | 2 | 0 | 0 | 0 | 0 | 0 | 0 |
| C | 0 | 0 | 0 | 0 | 0 | 0 | 0 | 0 | 0 | 0 | 0 | 1 | 2 | 2 | 2 |
| Y | 0 | 0 | 0 | 0 | 0 | 0 | 0 | 0 | 0 | 1 | 2 | 1 | 2 | 1 | 2 |

200 NP Matrix
202 First Set of NPs
204 Second Set of NPs

FIG. 3

NPac Vector 300

300-1:
M 0.2
MM 0.12
C 0.07
CM 0.07
CCM 0.04

302

300-2:
Y 0.16
YY 0.11
C 0.07
CY 0.08
CYY 0.04
CCYY 0.04

ENCODING PLURAL COLORANT VECTORS IN A NEUGEBAUER PRIMARY AREA COVERAGE VECTOR

BACKGROUND

A printer is capable of forming an image onto a print medium. A printer can form an image on a print medium by dispensing a printing fluid onto selected portions of the print medium. For color printing, a printer can dispense printing fluids of different colors onto a print medium to form a color image.

BRIEF DESCRIPTION OF THE DRAWINGS

Some implementations of the present disclosure are described with respect to the following figures.

FIG. 2 is a block diagram of a Neugebauer Primary (NP) matrix including multiple sets of NPs for respective different colorant vectors, according to some examples.

FIG. 3 is a block diagram of Neugebauer Primary area coverage (NPac) vector that encodes multiple colorant vectors, according to some examples.

Figure 1:
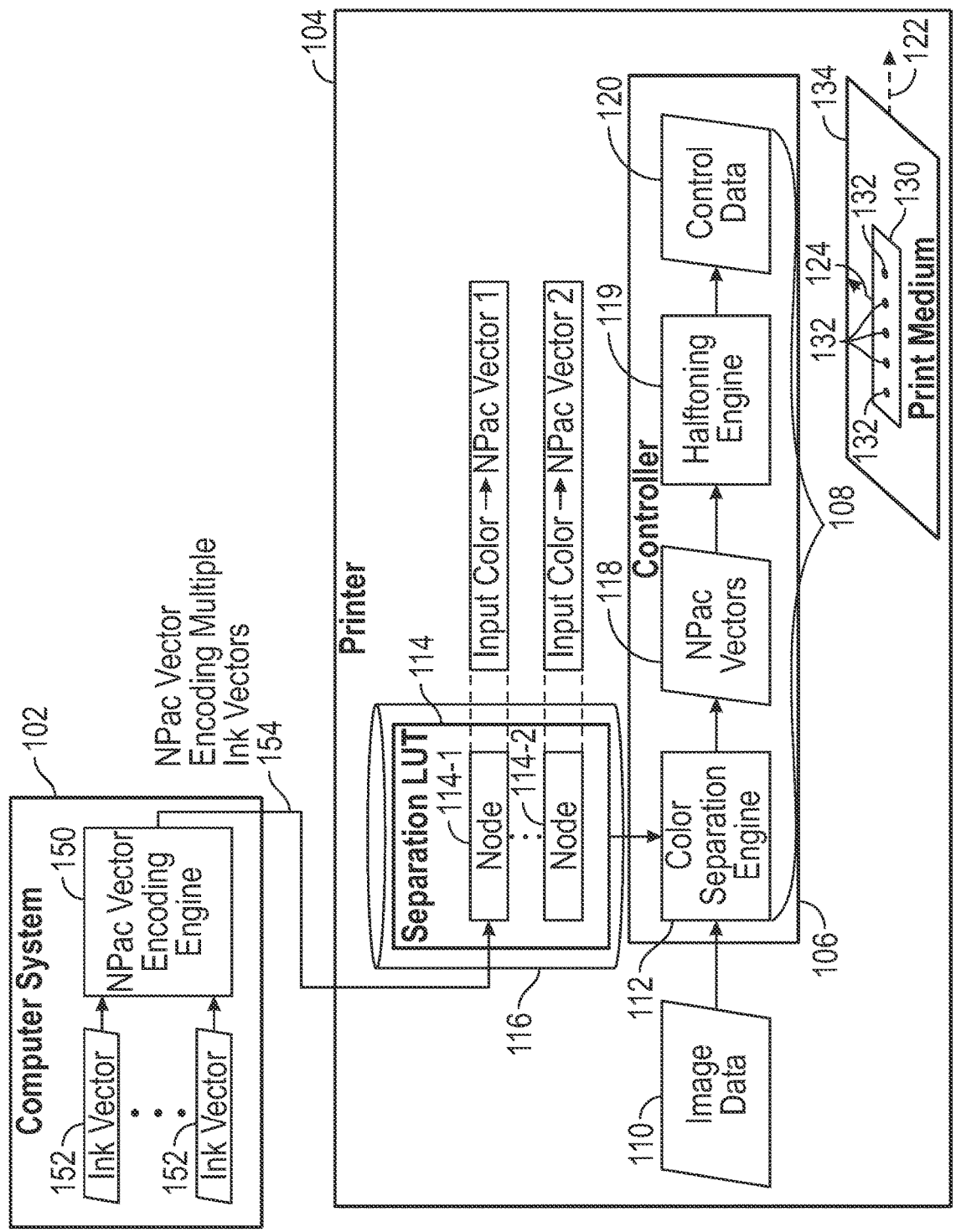
FIG. 1 is a block diagram of an arrangement that includes a computer system and a printer, according to some examples.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A printer may utilize a halftoning process to reproduce a continuous tone image in a colorant color space using a series of pixels. This enables the printer to approximate a continuous tone image by using a discrete number of colorants (e.g., a discrete number of printing fluid drops) deposited onto a print medium.

A colorant may be a print material, e.g., ink, dye, a pigment, toner, varnish, another type of printing agent, etc., or a combination thereof. The colorant may be defined with reference to a color space (which, in this case, may also be referred to as colorant space). The color space includes colors that may be obtained by a particular printer.

A print medium may include a paper medium, a cardboard medium, a textile medium, a plastic medium, and/or a medium of another material, such as a medium used in two-dimensional (2D) printing. Alternatively, a print medium can refer to a target (e.g., a layer of build material or a partially formed three-dimensional (3D) part) used in 3D printing.

A printed image printed using a halftoning process may appear continuous from a distance, e.g., colors blend into each other. However, when inspected at close range, the printed image is found to be constructed from layers of colorant with discrete deposit patterns.

The result of the halftoning process is an output in the form of a color separated halftone including a halftone plane corresponding to each colorant available to the printer. The output of any particular printer is dependent on the characteristics of the particular printing pipeline (including the set of data processing elements used in the printing processes) that is used by the printer.

The colorant content of a print resolution pixel (hereinafter termed "pixel") may be defined in terms of a Neugebauer Primary (NP), which specifies a combination of colorants to be deposited at a pixel location in a deposition process to produce the desired color for the pixel An NP is a combination of colorants available to a printer for reproducing colors that may have been received in a different color space and which have been mapped into a Neugebauer Primary area coverage (NPac) color space, which is an example of an area coverage color space. The area coverage color space is different from a color space of input image data received by the printer for printing an image on a print target (e.g., a print medium such as a paper in a two-dimensional (2D) printer or a portion of a three-dimensional (3D) object in a 3D printer). Examples of the color space of the input image data can include a cyan-magenta-yellow-black (CMYK) color space, a red-green-blue (RGB) color space, and so forth.

A single element in the NPac color space is a vector (referred to as an "NPac vector") that represents a statistical distribution of NPs over a given area of a halftone. NPacs represent the linear convex combinations of NPs. Each component of an NPac vector defines the probability of choosing a respective NP. For example, an NPac vector can define the following probabilities for each NP: ⅙ for W (blank or white in an example where the print target is white); 0 for C; ⅔ for M; 0 for Y; ⅗ for CM; ⅙ for CY; ⅙ for MY; ⅙ for CMY.

Each element of an NP may specify a quantity of a respective colorant for the associated pixel in the colorant color space. In a simple binary (bi-level, i.e., two drop states: "drop" or "no drop") printer, an NP may be one of $2^k-1$ combinations of k printing fluids within the printer, or an absence of printing fluid (resulting in $2^k$ NPs in total). A colorant or printing fluid combination as may be formed of one or multiple colorants or printing fluids such as ink. For example, if a bi-level printer uses CMY printing fluids, there can be eight NPs. These NPs relate to the following: C, M, Y, CM, CY, MY, CMY, and W (white or blank indicating an absence of printing fluid). An NP may include an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g., including printheads that are able to deposit N (N >1) drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), a total of 64 NPs, including for example C (one drop of cyan), CM (one drop of each of cyan and magenta), CMM (one drop of cyan and two drops of magenta), CMMM (one drop of cyan and three drops of magenta), etc.

Once an image is defined in terms of device state probabilities (e.g., NPacs), a choice is to be made to determine the actual pixel state for each pixel (e.g., the choice of one particular NP from the NPac vector).

In a printer, a Halftone Area Neugebauer Separation (HANS) pipeline (an example of a printing pipeline) can use area coverage representations, such as NPac vectors, for halftone generation.

A simple color space may be defined using ink vectors, where each ink vector represents the proportion of individual inks within a combination such as an NPac vector. For example, an ink vector may be a vector with a predefined set of elements, where each element represents an ink (more generally a colorant or color output available to an image output device). A value of the element in the ink vector represents a quantity of ink (e.g., C, M, Y, K). An ink vector may be used to instruct deposit of inks in a printer, e.g., where the value represents a particular number of ink drops or quantity of ink to deposit. An ink vector may be used to instruct the printing of a color in an addressable area of a print medium (e.g. a print "pixel").

In some cases, it may be beneficial to encode multiple ink vectors into a single NPac vector. Such an NPac vector includes multiple sets of NPs that correspond to the different ink vectors, i.e., the NPac vector includes a first set of NPs for a first ink vector, a second set of NPs for a second ink vector, and so forth. Determining a dividing point between the different sets of NPs for the respective ink vectors can be challenging, and if not set optimally, may produce artifacts when forming an output image by an image output device, such as a printer, a display device, and so forth.

In accordance with some implementations of the present disclosure, a linear programming optimization technique can be employed to encode multiple colorant vectors (e.g., ink vectors) into a single NPac vector.

FIG. 1 is a block diagram of an example arrangement that includes a computer system 102 and a printer 104. The printer 104 can be a 2D or 3D printer.

The printer 104 includes a printing pipeline 108, a printhead 130 that includes an array of nozzles 132, and a print medium 134 onto which printing fluids can be ejected from the nozzles 132 that are actuated.

The printer 100 can be a 2D printer that prints images onto the print medium 134, such as a paper, a plastic foil, a cloth substrate, and so forth. In other examples, techniques or mechanisms according to some implementations of the present disclosure can be applied with a 3D printer, in which printing fluids can be dispensed onto targets in the form of 3D parts for the purpose of forming a 3D object. In a 3D printer, a 3D object is built on a layer-by-layer basis, in which layers of build material are provided onto a print bed, followed by dispensing of printing fluids (e.g., using a printhead) onto each successive build material layer for defining portions of the 3D object.

The printing pipeline 108 can be part of a printer controller (or more simply a "controller") 106 in the printer 104. In other examples, the printing pipeline 108 can be implemented in a computer system separate from the printer 104. In some examples, the printing pipeline 108 includes a Halftone Area Neugebauer Separation (HANS) pipeline.

The printing pipeline 108 generates control data 120 to control printing an image on the print medium 134. The printing pipeline 108 receives input image data 110 from which the printer 104 is to print an image on the print medium 134. The input image data 110 is passed to a color separation engine 112. The input image data 110 may include color data represented in an image color space, such as the CMYK color space, the RGB color space, and so forth.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit. The engine can include a portion of the hardware processing circuit of the controller 106, or alternatively, the engine can include machine-readable instructions executable by the controller 106.

The color separation engine 112 maps the color data from the image color space to an intermediate color space, which in some examples is the NPac color space. The mapping from the image color space to the NPac color space uses a separation lookup table (LUT) 114, which can also be referred to as a color separation LUT (e.g., a HANS LUT).

The separation LUT 114 includes a data structure stored in a storage medium 116. The storage medium 116 can be implemented with a collection of storage devices (a single storage device or multiple storage devices). Examples of storage devices can include any or some combination of the following: memory device(s), disk-based storage device(s), solid-state drive(s), and so forth.

Based on the input image data 110 and the separation LUT 114, the color separation engine 112 produces corresponding NPac vectors 118. Spatial distribution of NPs in an NPac vector 118 according to a probability distribution specified in the NPac vector may be performed using a halftone technique, such as a matrix-selector-based Parallel Random Area Weighted Area Coverage Selection (PARAWACS) technique. This may result in discrete deposit instructions for print resolution pixels, e.g., instructing 0 to N (N≥1) drops of each of the k printing fluids on an addressable area of a print medium. Over a plurality of addressable areas, e.g., an area of a print medium, having a color defined by an NPac vector, the distribution of the printed output will tend towards the statistical distribution of area coverage defined by the NPac vector.

The NPac vectors 118 produced by the color separation engine 112 are provided to a halftoning engine 119 in the printing pipeline 108. The halftoning engine 119 applies a halftoning process (e.g., a PARAWACS halftoning process or another type of halftoning process) to reproduce a continuous tone image (as represented by the image data 110 in the image color space) in a colorant color space using a series of shapes (e.g., dots).

The control data 120 is used by the controller 106 to control printing operations to print the image according to the input image data 110. The printing operations can include advancing the print medium 134 in a print medium advance direction 122, as well as moving the printhead 130 along a direction 124 in each pass of the printhead 130. The printhead 130 may be mounted on a carriage that can be moved under control of the storage controller.

In some examples, the printer 104 employs multiple passes when printing an image. With multi-pass printing, each pixel of the image to be printed is subject to receiving ejected printing fluids multiple times in the respective multiple passes, depending on actuation of nozzles according to the input image data 110.

The content of the separation LUT 114 can be determined by the computer system 102 as part of pre-processing performed at the computer system 102 (prior to processing performed by the printer 104, such as by the printing pipeline 108). The computer system 102 includes an NPac vector encoding engine 150 that is able to encode multiple ink vectors 152 (or more generally, multiple colorant vectors) into an NPac vector.

Traditionally, a separation LUT provides a single ink vector or NPac for each device-color-indexed node of the separation LUT. The entries of the separation LUT are referred to as nodes, where each node maps an input color (such as in the input image data 110) to a respective NPac vector. In such traditional examples, an NPac vector encodes a single ink vector. As a result, each device color input (e.g., RGB or CMYK) uniquely determines how a printer's colorants are used. There are, however, situations in which it may be beneficial to select from among multiple choices at a later stage of the printing pipeline 108, such as past the color separation stage performed by the color separation engine 112.

As noted above, according to some implementations of the present disclosure, linear programming can be applied to include and optimize two or more different ink vectors of the same printer in a single NPac vector. Encoding the information of multiple ink vectors in a single NPac vector allows for the information of the multiple ink vectors to transparently pass through the color separation stage (as implemented by the color separation engine 112) of the printing pipeline 108 so that a later process in the printing pipeline 108 can use the information. The later process can include a halftoning stage performed by the halftoning engine 119, or a post-halftone image processing stage, or a masking and error-hiding stage, and so forth.

The NPac vector encoding engine 150 according to some examples of the present disclosure encodes multiple ink vectors into an NPac vector 154, which can then be output by the computer system 102 to the printer 104. The NPac vector 154 is added to a node of the separation LUT 114. In some examples, the NPac vector encoding engine 150 in the computer system 102 can populate nodes of the separation LUT 114 at the computer system 102 with respective NPac vectors.

The separation LUT 114 includes multiple nodes, where each node maps an input color in an input color space to a respective NPac vector. In an example, a node 114-1 of the separation LUT 114 can map an input color to NPac vector 1, which may encode multiple ink vectors. Another node 114-2 of the separation LUT 114 can map an input color to NPac vector 2, which may encode multiple ink vectors or a single ink vector. More generally, the nodes of the separation LUT 114 can map input colors to respective NPac vectors; at least some of the NPac vectors encode multiple ink vectors.

Each of multiple ink vectors encoded in an NPac vector can specify ink amounts. The printing pipeline 108 can select one of the multiple ink vectors to use during a later process in the printing pipeline 108, e.g., after the color separation stage, to produce an image on the print medium 134.

An issue associated with encoding multiple ink vectors in an NPac vector relates to how to convert these multiple ink vectors into a single NPac vector while maintaining control over proprieties of the NPac vectors to avoid ink interactions or blank spaces that may contribute to grain.

The following describes example techniques that can be implemented by the NPac vector encoding engine 150 to encode multiple ink vectors into an NPac vector. In some examples, the NPac vector encoding engine 150 can use a linear programming technique to encode multiple ink vectors into an NPac vector.

The linear programming technique uses two functions: 1) a first function that sets the sum of the area coverages of the NPs be equal to area coverages of the ink vectors, and 2) a second function that is an objective function. Linear programming is an optimization technique for a system of linear constraints and a linear objective function. The objective function defines the quantity to be optimized, and the goal of linear programming is to find the values of the variables that maximize or minimize the objective function.

Reference is made to FIG. 2 in the following discussion. FIG. 2 shows an NP matrix 200 that includes a first set of NPs 202 for a first ink vector, and a second set of NPs 204 for a second ink vector.

In the example of FIG. 2, it is assumed that the first ink vector is {C:1, M:0.5}, and the second ink vector is {C:0.5, Y:0.5}. A value of an element (e.g., C:1 or M:0.5 or C:0.5 or Y:0.5 in the above example) in an ink vector represents a quantity of ink—the first ink vector indicates that the quantity of M is half that of C, and the second ink vector indicates that the quantity of M is equal to that of Y. When the printer 104 prints using the first ink vector, the printer 104 can dispense 2 drops of C and 1 drop of M, or any other combination of drops of C and M that satisfy the ratio of 1 to 0.5.

The merging of the first and second ink vectors above results in {C:1, M:0.5, C:0.5, Y:0.5}.

In the example NP matrix 200 of FIG. 2, a first set 206 of inks (C, M) are the inks of the first ink vector, and a second set 208 of inks (C, Y) are the inks of the second ink vector.

Each column of the NP matrix 200 represents a respective NP. For example, column 212 represents NP M associated with the first ink vector, column 214 represents NP MM associated with the first ink vector, column 216 represents NP CCMM associated with the first ink vector, column 218 represents NP Y associated with the second ink vector, column 220 represents NP YY associated with the second ink vector, column 222 represents NP CCYY associated with the second ink vector, and so forth.

The NPs represented by non-shaded blocks are part of the first set of NPs 202 for the first ink vector, and the NPs represented by shaded blocks are part of the second set of NPs 204 for the second ink vector.

A column 224 in the NP matrix 200 represents a blank NP, which does not include any ink.

As noted above, the first function of the linear programming technique sets the sum of the area coverages of NPs be equal to area coverages of the ink vectors (this is the linear constraint). An example of the first function is expressed by Eq. 1 below.

$$\text{NPmatrix}_{((Colorants+[1])\times NPs)} \times \text{AreaCoverages}_{(NPs\times 1)} = \text{InkVectors}_{((Colorants+[1])\times 1)} \quad \text{(Eq. 1)}$$

NP matrix$_{((Colorants+[1])\times NPs)}$ represents an NP matrix including NPs (e.g., the NP matrix 200 of FIG. 2), InkVectors$_{((Colorants+[1])\times 1)}$ represents ink vectors, and AreaCoverages$_{(NPs\times 1)}$ represents the area coverages of the NPs in the NP matrix.

An area coverage of an NP has a value between 0 and 1 and represents the probability of selecting an NP for a given pixel, as specified in an NPac vector, or stated differently, the area coverage represents the percentage of times that the NP will be used in a respective area for the NPac vector.

Depending upon the number (n,n ≥1) of ink vectors (as represented by $\text{InkVectors}_{((Colorants+[1])\times 1)}$) to be encoded in an NPac vector, there will be n times the number of NPs in the NP matrix (as represented by NP $\text{matrix}_{((Colorants+[1])\times NPs)}$) and n times the number of sets of colorants as represented by Colorants. In the example of FIG. 2, n =2 and thus there are 2 sets of NPs 202 and 204 in the NP matrix 200, and 2 sets of colorants (a first set including C and M in the first two rows of the NP matrix 200, and a second set including C and Y in the last two rows of the NP matrix 200).

Multiplying the NPs in the NP matrix 200 by the respective area coverages results in the drops targeted by the ink vectors. Also, by adding a row of all 1s to both the NP matrix and the target ink vector, the technique can constrain the sum of all the area coverages to be 1. Eq. 1 represents this with [1]. For example, according to Eq. 1, [1, 1, 1, 1, 1] ×[ac1, ac2, ac3, ac4, ac5] =1, to ensure that the sums of the area coverages (e.g., ac1 to ac5 in the above example) are 1.

The second function of the linear programming technique is the objective function, which seeks to find a solution that given weights assigned to respective NPs in the NP matrix 200 corresponding to n ink vectors, minimizes the overall resulting weight:

$$\min(\text{Weights}_{(1\times NPs)}\times \text{AreaCoverages}_{(NPs\times 1)}).$$

The weights as represented by $\text{Weights}_{(1\times NPs)}$ can be pre-assigned, such as by a human, a program, or a machine. For example, the weights can indicate whether single NPs (e.g., C, M, Y) are favored, or whether mixed NPs (e.g., CM, CY) are favored. Which NPs to favor by assigning respective weights to the NPs can depend upon properties of a printer, such as graininess or robustness of images produced by the printer.

The objective function defines the quantity to be optimized, and the goal of linear programming is to find the values of the variables (in this case the area coverages of $\text{AreaCoverages}_{(NPs\times 1)}$) that maximize or minimize the objective function.

The linear programming technique can find an NPac vector that (1) fires the amounts of ink corresponding to the n ink vectors, (2) has area coverages of the NPac vector that encodes the n ink vectors sum to 1, and (3) uses the more preferred NPs as indicated by the NP weights.

When multiple ink vectors are to be encoded into a single NPac vector using the linear programming technique, each of the matrices and arrays in Eq. 1 (including NP $\text{matrix}_{((Colorants+[1])\times NPs)}$, $\text{AreaCoverages}_{(NPs\times 1)}$, $\text{InkVectors}_{((Colorants+[1])\times 1)}$, and $\text{Weights}_{(1\times NPs)}$) and the objective function having n times the number of both NPs and colorants, where n is the number of ink vectors to include.

Thus, the length of each of the $\text{AreaCoverages}_{(NPs\times 1)}$ and $\text{Weights}_{(1\times NPs)}$ is equal to the total quantity of NPs in the NP matrix, where the total quantity of NPs are those NPs in the n sets of NPs in the NP matrix.

As seen in the NP matrix 200 that includes inks for multiple ink vectors and has multiple sets of NPs, there are "repeated" inks (C) (C in the first ink vector and C in the second ink vector) and "repeated" NPs (C and CC in the two sets of NPs 202 and 204 (in other words, the NP C is in both the sets of NPs 202 and 204, as is the NP CC. The repeated inks and NPs are treated as different during processing in the printing pipeline 108, since the repeated inks and NPs are derived from different ink vectors. At the end of the process of the printing pipeline 108, the printing pipeline 108 merges the repeated NPs to sum the area coverages for the repeated NP (e.g., C or CC) as represented in the NPac vector that encodes the multiple ink vectors into an aggregate area coverage.

Depending on the weights assigned to each NP of the NPs in the NP matrix 200 (note that it is possible that weights assigned to a repeated NP such as C or CC in the two sets of NPs 202 and 204 may be different), the linear programming technique applied by the NPac vector encoding engine 150 of FIG. 1 produces an NPac vector that splits the two ink vectors' area coverages most optimally (according to the weights and solving for the objective function).

FIG. 3 shows an example of an NPac vector 300 with two NPac vector segments 300-1 and 300-2 that correspond to NPs of the respective two sets of NPs 202 and 204 for the two different ink vectors. In other words, the NPac vector segment 300-1 assigns probabilities to each NP with non-zero weight of the first set of NPs 202, and the NPac vector segment 300-2 assigns probabilities to each NP with non-zero weight of the second set of NPs 204. Note that any NP in the first set of NPs 202 not included in the NPac vector segment 300-1 is assigned a zero weight, and similarly, any NP in the second set of NPs 204 not included in the NPac vector segment 300-2 is assigned a zero weight.

A boundary 302 splits the NPac vector 300 into the NPac vector segments 300-1 and 300-2. In the example of FIG. 3, the boundary 302 is at a midpoint of the NPac vector 300 (in other words, the probabilities assigned to the NPs in each NPac vector segment 300-1 or 300-2 sum to 0.5). In other examples, the boundary 302 may shift upwardly or downwardly such that the sum of probabilities assigned to the NPs in the NPac vector segment 300-1 may be greater than or less than the sum of probabilities assigned to the NPs in the NPac vector segment 300-2.

The position of the boundary 302 is based on the weights assigned to the NPs in the two sets of NPs 202 and 204, and is dynamically determined based on the objective function of the linear programming technique. By setting the boundary 302 close to a midpoint of the NPac vector 300, better balance can be achieved between use of NPs for the first and second ink vectors to avoid overusing NPs for one ink vector over NPs for another ink vector. By avoiding significant asymmetry between use of NPs in the respective NPac vector segments 300-1 and 300-2, image quality of images produced by the printing pipeline 108 can be improved, such as to reduce graininess or reduced banding in the output image. Also, flexibility is enhanced since the area coverage split provided by the NPac vector that encodes multiple ink vectors is not fixed but can vary depending on the optimization provided by the linear programming technique.

Note that in the NPac vector 300, the NP C is repeated in the NPac vector segments 300-1 and 300-2. The printing pipeline 108 in a later stage (such as in the halftoning stage or another post-color separation stage) can merge the area coverages (probabilities) assigned to the NP C in the NPac vector segments 300-1 and 300-2. In the NPac vector segment 300-1, NP C is assigned the probability 0.07, and in the NPac vector segment 300-2, NP C is assigned the probability 0.07. The printing pipeline 108 can sum the probabilities assigned to the repeated NP C in the NPac vector segments 300-1 and 300-2, to produce a probability of 0.14(0.07 +0.07) for the NP C.

Figure 4:
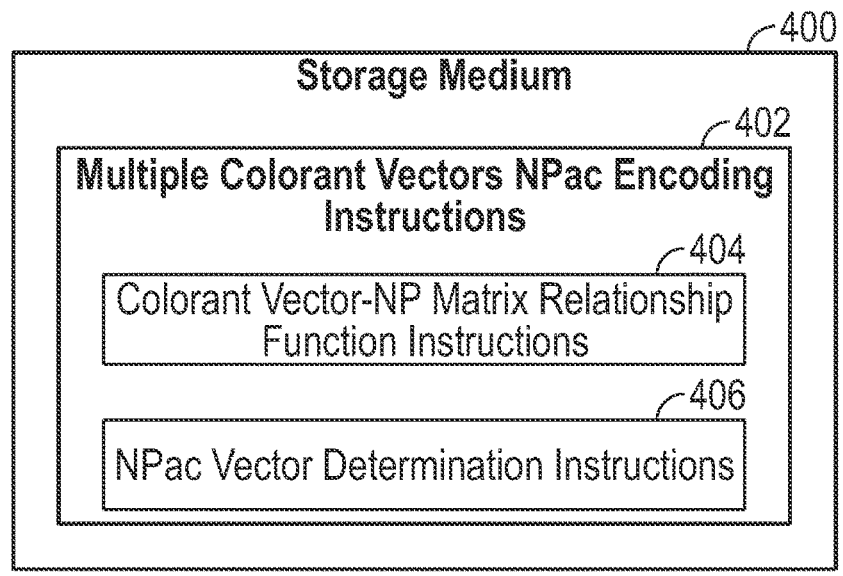
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system (e.g., the computer system 102 of FIG. 1) to perform various tasks.

The machine-readable instructions include multiple colorant vectors NPac encoding instructions 402 to encode a plurality of colorant vectors (e.g., the ink vectors 152 of FIG. 1) of a printer in an NPac vector for use in selecting colorants to output an image by the printer.

The multiple colorant vectors NPac encoding instructions 402 include colorant vector-NP matrix relationship function instructions 404 to perform the encoding by using a function that relates the plurality of colorant vectors to an NP matrix (e.g., 200 in FIG. 2) including a plurality of sets of NPs (e.g., 202 and 204 in FIG. 2) that correspond to different colorant vectors of the plurality of colorant vectors.

The multiple colorant vectors NPac encoding instructions 402 further include NPac vector determination instructions 406 to determine the NPac vector based on achieving an objective for the function, such as the objective function of a linear programming technique.

In some examples, the function specifies a constraint on a variable (e.g., area coverages of NPs), and the objective defines a quantity to be optimized by finding values of the variable.

In some examples, the constraint specifies that the area coverages of respective NPs of the plurality of sets of NPs are to sum to 1.

In some examples, the objective minimizes an overall weight that is based on weights assigned to respective NPs of the plurality of sets of NPs.

In some examples, the NPac vector includes a plurality of NPac vector segments including NPs corresponding to different colorant vectors of the plurality of colorant vectors.

In some examples, a first NPac vector segment of the plurality of NPac vector segments includes a first NP, and a second vector segment of the plurality of NPac vector segments includes the first NP that is repeated from the first NP in the first NPac vector segment.

Figure 5:
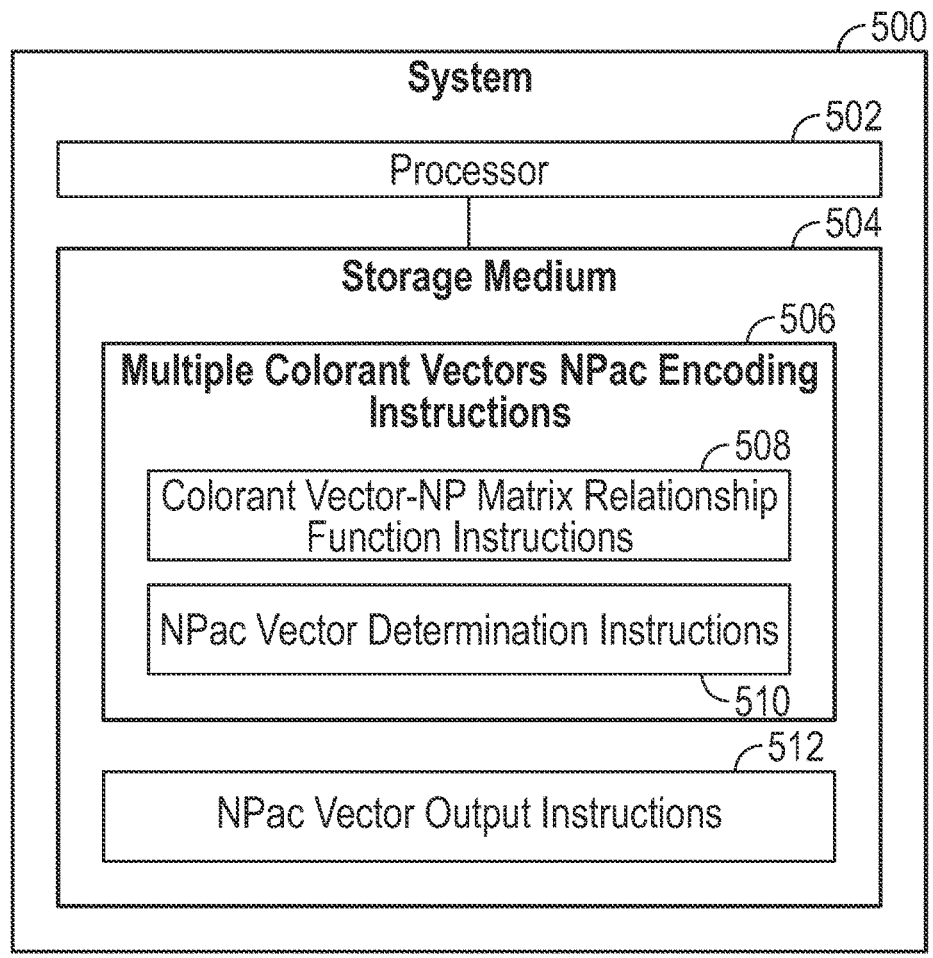
FIG. 5 is a block diagram of a system according to some examples.

FIG. 5 is a block diagram of a system 500 (including a computer or multiple computers). The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include multiple colorant vectors NPac encoding instructions 506 to encode a plurality of colorant vectors of a printer in an NPac vector for use in selecting colorants to output an image by the printer.

The multiple colorant vectors NPac encoding instructions 506 include colorant vector-NP matrix relationship function instructions 508 to perform the encoding by using a function that relates the plurality of colorant vectors to an NP matrix including a plurality of sets of NPs that correspond to different colorant vectors of the plurality of colorant vectors.

The multiple colorant vectors NPac encoding instructions 402 include NPac vector determination instructions 510 to determine the NPac vector based on achieving an objective for the function.

The machine-readable instructions in the storage medium 504 include NPac vector output instructions 512 to output the NPac vector for inclusion in an entry of separation lookup table used by the printer in performing color separation.

Figure 6:
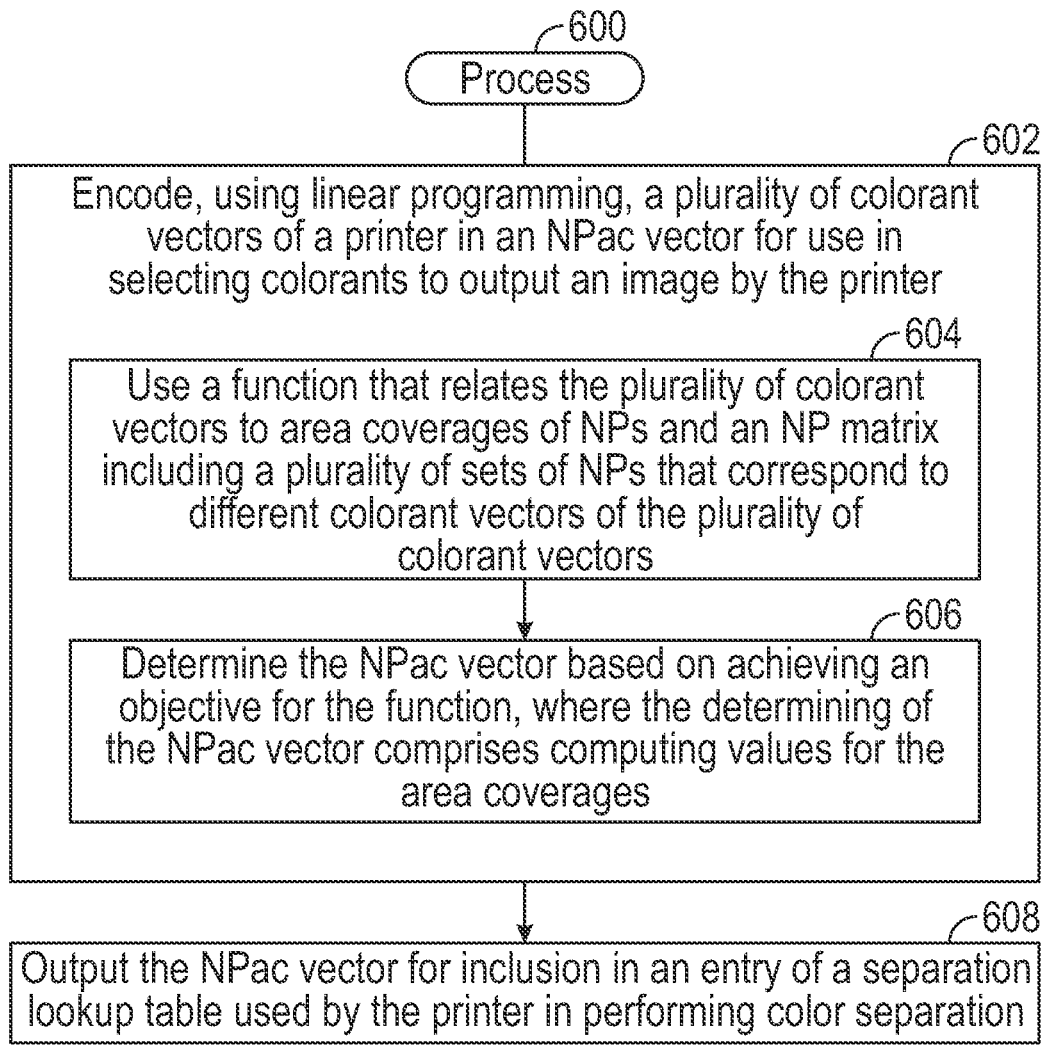
FIG. 6 is a flow diagram of a process according to some examples.

FIG. 6 is a flow diagram of a process 600 according to some examples, which can be performed by a system including a hardware processor.

The process 600 includes encoding (at 602), using linear programming, a plurality of colorant vectors of a printer in an NPac vector for use in selecting colorants to output an image by the printer. The encoding includes using (at 604) a function that relates the plurality of colorant vectors to area coverages of NPs and an NP matrix including a plurality of sets of NPs that correspond to different colorant vectors of the plurality of colorant vectors.

The encoding further includes determining (at 606) the NPac vector based on achieving an objective for the function, where the determining of the NPac vector comprises computing values for the area coverages.

The process 600 includes outputting (at 608) the NPac vector for inclusion in an entry of separation lookup table used by the printer in performing color separation.

A storage medium (e.g. 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   encode a plurality of colorant vectors of a printer in a Neugebauer Primary area coverage (NPac) vector for use in selecting colorants to output an image by the printer, the encoding comprising:
   using a function that relates the plurality of colorant vectors to an NP matrix including a plurality of sets of NPs that correspond to different colorant vectors of the plurality of colorant vectors, and
   determining the NPac vector based on achieving an objective for the function.

2. The non-transitory machine-readable storage medium of claim 1, wherein the function specifies a constraint on a variable, and the objective defines a quantity to be optimized by finding values of the variable.

3. The non-transitory machine-readable storage medium of claim 2, wherein the variable comprises an area coverage of each NP of the plurality of sets of NPs.

4. The non-transitory machine-readable storage medium of claim 3, wherein the constraint specifies that the area coverages of respective NPs of the plurality of sets of NPs are to sum to 1.

5. The non-transitory machine-readable storage medium of claim 3, wherein the objective minimizes an overall weight that is based on weights assigned to respective NPs of the plurality of sets of NPs.

6. The non-transitory machine-readable storage medium of claim 5, wherein the weights comprise a first weight assigned to a first NP of the plurality of sets of NPs, and a second weight assigned to a second NP of the plurality of sets of NPs.

7. The non-transitory machine-readable storage medium of claim 6, wherein the first weight is greater in value than the second weight, to favor selection of the first NP over the second NP.

8. The non-transitory machine-readable storage medium of claim 1, wherein the NP matrix includes rows corresponding to colorants specified in the plurality of colorant vectors, and columns corresponding to respective NPs of the plurality of sets of NPs.

9. The non-transitory machine-readable storage medium of claim 8, wherein a first set of the NPs of the NP matrix correspond to a first colorant vector of the plurality of colorant vectors, and a second set of the NPs of the NP matrix correspond to a second colorant vector of the plurality of colorant vectors.

10. The non-transitory machine-readable storage medium of claim 1, wherein the NPac vector comprises a plurality of NPac vector segments including NPs corresponding to different colorant vectors of the plurality of colorant vectors.

11. The non-transitory machine-readable storage medium of claim 10, wherein a first NPac vector segment of the plurality of NPac vector segments includes a first NP, and a second vector segment of the plurality of NPac vector segments includes the first NP that is repeated from the first NP in the first NPac vector segment.

12. A system comprising:
a processor; and
a non-transitory storage medium comprising instructions executable on the processor to:
encode a plurality of colorant vectors of a printer in a Neugebauer Primary area coverage (NPac) vector for use in selecting colorants to output an image by the printer, the encoding comprising:
using a function that relates the plurality of colorant vectors to an NP matrix including a plurality of sets of NPs that correspond to different colorant vectors of the plurality of colorant vectors, and
determining the NPac vector based on achieving an objective for the function; and
output the NPac vector for inclusion in an entry of separation lookup table used by the printer in performing color separation.

13. The system of claim 12, wherein the encoding of the plurality of colorant vectors in the NPac vector is based on a linear programming technique that assigns values to area coverages of the NPs of the plurality of sets of NPs based on optimizing an objective function.

14. A method of a system comprising a hardware processor, comprising:
encoding, using linear programming, a plurality of colorant vectors of a printer in a Neugebauer Primary area coverage (NPac) vector for use in selecting colorants to output an image by the printer, the encoding comprising:
using a function that relates the plurality of colorant vectors to area coverages of NPs and an NP matrix including a plurality of sets of NPs that correspond to different colorant vectors of the plurality of colorant vectors, and
determining the NPac vector based on achieving an objective for the function, wherein the determining of the NPac vector comprises computing values for the area coverages; and
outputting the NPac vector for inclusion in an entry of separation lookup table used by the printer in performing color separation.

15. The method of claim 14, wherein the NPac vector includes a plurality of NPac vector segments for respective colorant vectors of the plurality of colorant vectors, and the NPac vector is for use by a stage of a printing pipeline after a color separation stage of the printing pipeline.

* * * * *